US006181584B1

(12) United States Patent
Koizumi et al.

(10) Patent No.: US 6,181,584 B1
(45) Date of Patent: Jan. 30, 2001

(54) SEMICONDUCTOR DEVICE WITH INTERNAL POWER SUPPLY CIRCUIT, TOGETHER WITH LIQUID CRYSTAL DEVICE AND ELECTRONIC EQUIPMENT USING THE SAME

(75) Inventors: Norio Koizumi; Masahiko Tsuchiya, both of Suwa (JP)

(73) Assignee: Seiko Epson Corporation, Tokyo (JP)

( * ) Notice: Under 35 U.S.C. 154(b), the term of this patent shall be extended for 0 days.

(21) Appl. No.: 09/534,532

(22) Filed: Mar. 27, 2000

(30) Foreign Application Priority Data

Mar. 30, 1999 (JP) ........................................ 11-089668

(51) Int. Cl.[7] .......................... H02M 3/18; H02M 7/00

(52) U.S. Cl. .......................................... 363/60; 307/110

(58) Field of Search ........................ 363/59, 60; 307/109, 307/110

(56) References Cited

U.S. PATENT DOCUMENTS 4,186,436 * 1/1980 Ishiwatari .............................. 363/60
5,757,632 * 5/1998 Beppu et al. .......................... 363/60
5,969,960 * 10/1999 Tachon et al. ......................... 363/60
6,011,707 * 1/2000 Mine ...................................... 363/60
6,075,403 * 6/2000 Ishikawa et al. ...................... 363/60

FOREIGN PATENT DOCUMENTS 0 424 958 A2 5/1991 (EP) ................................ G09G/3/36
0 479 304 A2 4/1992 (EP) ................................ G09G/3/36
0 642 112 A1 3/1995 (EP) ................................ G09G/3/36
0 721 137 A1 7/1996 (EP) ................................ G02F/1/133
0 750 208 A1 12/1996 (EP) ................................ G02F/1/133
0 881 622 A1 12/1998 (EP) ................................ G09G/3/36

* cited by examiner

*Primary Examiner*—Peter S. Wong
*Assistant Examiner*—Bao Q. Vu
(74) *Attorney, Agent, or Firm*—Oliff & Berridge, PLC

(57) ABSTRACT

A semiconductor device that is capable of preventing erroneous operation such as momentary lighting, having a booster circuit to which first and second power supply potentials VDD and VSS are supplied from an external power source, for boosting the absolute value of the potential difference therebetween and charging the boosted potential to a capacitor. This booster circuit has a plurality of transistors and a plurality of capacitors, and the boosted potential is charged to one of the plurality of capacitors in accordance with how the plurality of transistors are turned on or off. The gates of a plurality of transistors are connected to output lines of first and second NAND circuits, to which the output of a comparator is input through a buffer. The output of the comparator is at a low level when the second power supply potential VSS is higher than a reference potential VREG, such as when the power is forcibly cut, in which case the charge in one of the plurality of capacitors is discharged, based on the outputs from the first and second NAND circuits.

13 Claims, 9 Drawing Sheets

PRIOR ART

SEMICONDUCTOR DEVICE WITH INTERNAL POWER SUPPLY CIRCUIT, TOGETHER WITH LIQUID CRYSTAL DEVICE AND ELECTRONIC EQUIPMENT USING THE SAME

BACKGROUND OF THE INVENTION

1. Field of the Invention

This invention relates to a semiconductor device with an internal power supply circuit, together with a liquid crystal device and electronic equipment that use the same, and, in particular, to the prevention of erroneous operation in the event of a power supply emergency, such as when a battery is removed.

2. Description of Related Art

In a liquid crystal display device, voltages are applied to a liquid crystal that is sandwiched between substrates on which electrodes are formed, to provide a display. This type of liquid crystal display device has recently become common in various types of electronic equipment, such as personal computers, word processors, portable telephones, and electronic organizers.

Electronic equipment that has such a liquid crystal display device has countermeasures such that the screen is momentarily blanked when power is turned off in a predetermined sequence. However, a phenomenon called momentary lighting can occur if the display is ended in a different sequence such as the battery is removed abruptly when the display is being driven or the electronic equipment is forcibly terminated. This phenomenon causes a momentary blanking of the screen when the battery is removed while the display is being driven, followed by the display artifacts such as horizontal lines on the screen for a while, by way of example.

The present inventors have analyzed the causes of this momentary lighting phenomenon and have devised this invention in the light thereof.

SUMMARY OF THE INVENTION

An objective of this invention is to provide a semiconductor device with an internal power supply circuit that makes it possible to prevent erroneous operation such as momentary lighting caused in the event of a power supply emergency, together with a liquid crystal device and electronic equipment that use this semiconductor device.

According to an aspect of the present invention, there is provided a semiconductor device with a power supply circuit, wherein the power supply circuit comprises:

a booster circuit to which first and second power supply potentials are supplied from an external power source, for boosting the absolute value of a difference between the first and second power supply potentials and for charging the boosted potential in a capacitor in the booster circuit; and a discharge circuit for causing the discharge of the potential charged into the capacitor, before the first and second power supply potentials become equal, based on a signal that becomes active in the event of a power supply emergency when the absolute value of a difference between the first and second power supply potentials falls below a predetermined value.

If, for example, the power supply fails after a battery is removed, the first and second power supply potentials supplied from the external power source become equal, at a level such as ground, after a certain time has elapsed.

Erroneous operation such as momentary lighting can occur when the time required for discharging the charge on the capacitor within the booster circuit, after the battery is removed and thus the power supply fails, is longer than the time taken until the first and second power supply potentials become equal.

This erroneous operation such as momentary lighting can be prevented by discharging the output potential of the booster circuit before the first and second power supply potentials become equal, based on a signal that becomes active in the event of the power supply emergency when the absolute value of the difference between the first and second power supply potentials falls below a predetermined value.

The booster circuit may comprise a switching circuit for turning one end of the capacitor on and off, based on a logic signal during boosting; and the discharge circuit may cause the switching circuit to be forcibly turned on in the event of the power supply emergency, regardless of the logic of the logic signal, to cause the discharge of the potential charged into the capacitor.

During the boosting, the switching circuit turns on and off a connection at one end of the capacitor, based on the logic signal. The charge on the capacitor can be discharged by forcibly turning on the switching circuit regardless of the logic of the logic signal, in the event of the power supply emergency.

The discharge circuit may comprise:

a comparator for comparing a potential of the predetermined value with a potential of the external power source; and a logic gate circuit that controls the turning on and off of the switching circuit during a normal power supply operation, based on the logic of the logic signal, and causes the switching circuit to be forcibly turned on in the event of power supply emergency, based on the output logic of the comparator.

In this manner, it is possible to force the switching circuit on in the event of the power supply emergency, by providing the semiconductor device with an internal comparator that detects the power supply emergency and by giving precedence to the output logic of that comparator.

A power-on reset signal that becomes active in the event of the power supply emergency may be input to the discharge circuit. In this case, the discharge circuit may comprise a logic gate circuit that controls the turning on and off of the switching circuit during a normal power supply operation, based on the logic of the logic signal, and causes the switching circuit to be forcibly turned on in the event of power supply emergency, based on the logic of the power-on reset signal.

It is therefore possible to force the switching circuit on in the event of the power supply emergency, by using a power-on reset signal that is supplied from outside the semiconductor device, instead of providing a comparator within the semiconductor device as described above, and by giving precedence to the logic of that power-on reset signal.

The power supply circuit may comprise:

a potential generation circuit for generating a plurality of different potentials, based on the output potential of the booster circuit;

a drive circuit for outputting a drive potential selected from among the plurality of different potentials; and a drive control circuit for controlling the drive circuit by controlling the selection of the drive potential from among the plurality of different potentials.

Since the absolute value of the output potential of the booster circuit falls in this case, the absolute values of the plurality of different potentials generated by the potential generation circuit also fall in a similar manner. It is therefore possible to prevent erroneous operation of the drive circuit even when the drive potential is selected from a plurality of different potentials, because there is a fall in the absolute values of all the drive potentials. Moreover, it is not necessary to discharge all of the different potentials. Discharging the potential of the booster circuit on which the different potentials depend is only required.

The drive control circuit may comprise:

a logic circuit to which the first and second power supply potentials are input, for outputting a logic signal;

a group of level shifters to which are input the first potential and an output potential from a regulator, for shifting the level of an output of the logic circuit; and a selection signal generation circuit for generating a selection signal to be input to the drive circuit, based on an output of the group of level shifters.

In this case, it is possible to prevent erroneous operation such as momentary lighting, even in the event of the power supply emergency and the unstable output of the group of level shifters.

Other aspects of this invention relate to liquid crystal devices or items of electronic equipment that use the above described semiconductor device. Since the absolute values of drive voltages can be made to drop rapidly in such liquid crystal devices or items of electronic equipment, erroneous operation such as momentary lighting does not occur therein.

DESCRIPTION OF PREFERRED EMBODIMENTS

Embodiments of the present invention are described below with reference to the accompanying drawings.

Description of Liquid Crystal Device

Figure 1:
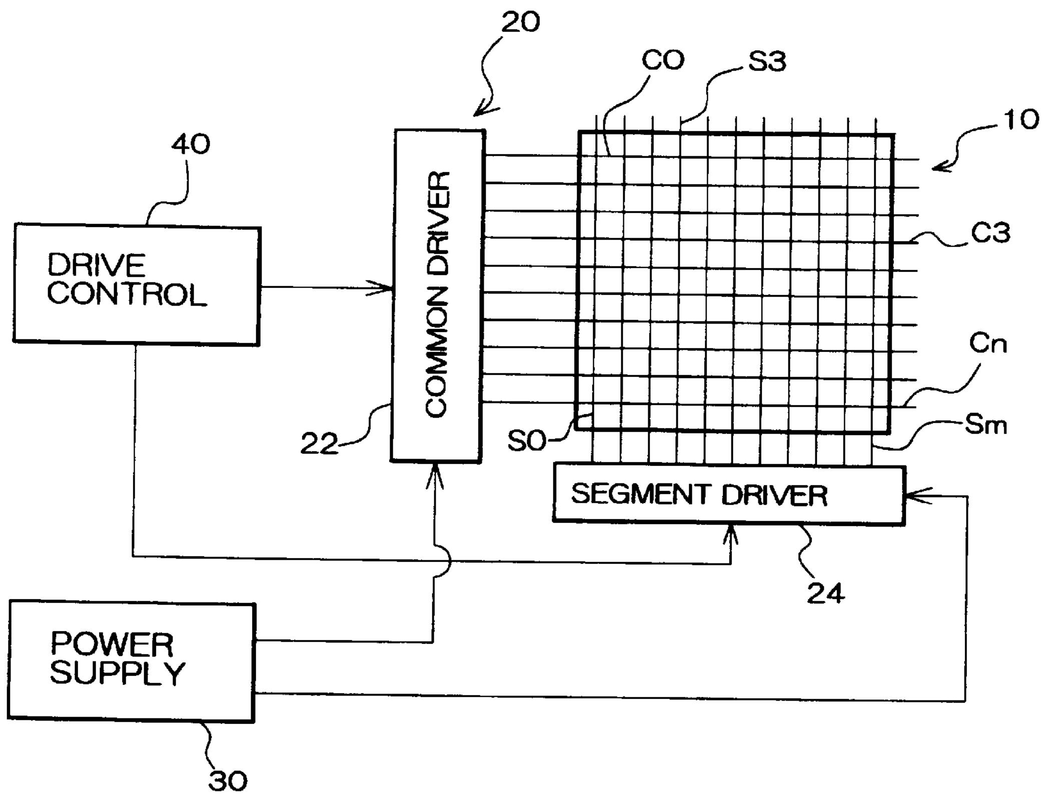
FIG. 1 is a block diagram of a liquid crystal device to which the present invention is applied.
Figure 2:
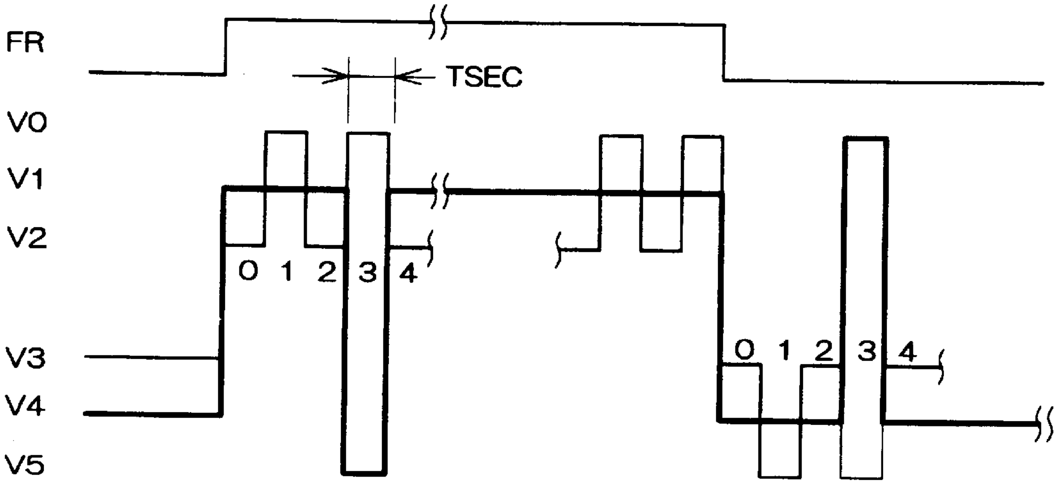
FIG. 2 is a waveform chart illustrating an example of the drive waveforms to be supplied to the liquid crystal panel of FIG. 1.

This configuration of main components of a liquid crystal device are shown in FIG. 1 and an example of drive waveforms used for driving a liquid crystal panel of FIG. 1 is shown in FIG. 2.

In FIG. 1, a liquid crystal panel 10 such as a simple matrix type of liquid crystal panel is formed by sealing a liquid crystal between a first substrate on which common electrodes C0 to Cm are formed and a second substrate on which segment electrodes S0 to Sn are formed. Each intersection between a common electrode and a segment electrode becomes a display pixel and there are (m+1)×(n+1) display pixels in this liquid crystal panel 10.

Note that any other type of liquid crystal panel, such as an active matrix type of liquid crystal display panel, could be used instead of the simple matrix type of the liquid crystal panel 10 used in this embodiment.

A common driver 22 connected to the common electrodes C0 to Cm and a segment driver 24 connected to the segment electrodes S0 to Sn are provided as a drive circuit 20 for driving this liquid crystal panel 10. A predetermined voltage is supplied from a power supply circuit 30 to the common driver 22 and the segment driver 24, and this predetermined voltage is also supplied selectively to common electrodes C0 to Cm and segment electrodes S0 to Sn, based on signals from a drive control circuit 40.

An example of a drive waveform in a frame period in which a common electrode C3 of the liquid crystal panel 10 of FIG. 1 is selected is shown in FIG. 2.

In FIG. 2, the bold line indicates the drive waveform that is supplied to each of the common electrodes C0 to Cm from the common driver 22 and the thinner line indicates the drive waveform that is supplied to each of the segment electrodes S0 to Sn by the segment driver 24.

The polarity of the voltages applied to the liquid crystal in FIG. 2 is reversed, based on a polarity-inverting signal FR. For that reason, six levels such as V0 to V5 are used as drive potentials, by way of example.

The drive waveform supplied from the common driver 22 varies between the potentials V0, V1, V4, and V5, as shown in FIG. 2. The drive waveform supplied from the segment driver 24, on the other hand, between the potentials V0, V2, V3, and V5.

Configuration of Semiconductor Device

Figure 3:
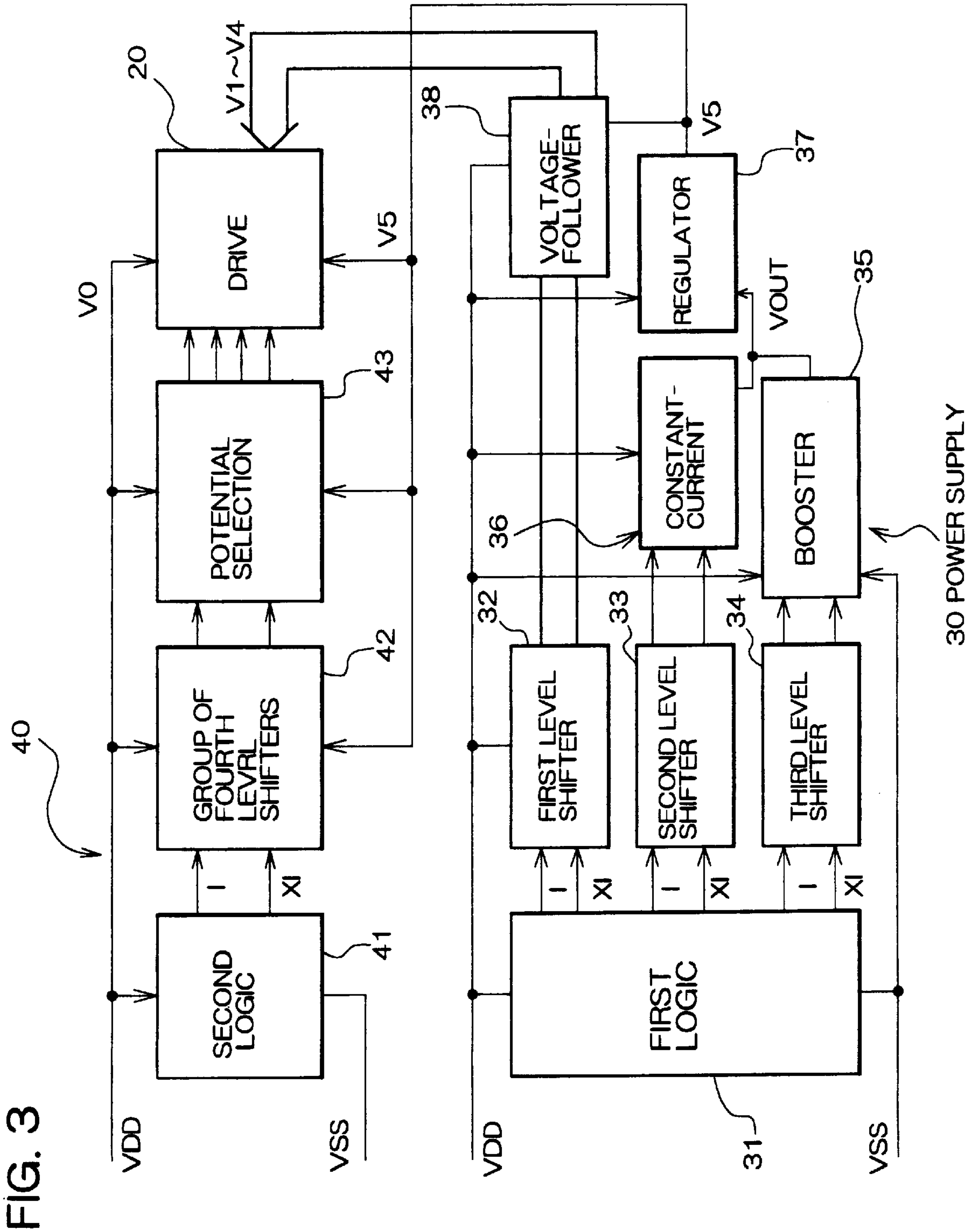
FIG. 3 is a block diagram of a one-chip semiconductor device in which the drive circuit, drive control circuit, and power supply circuit of FIG. 1 are installed.

The description now turns to details of a one-chip semiconductor device that comprises the drive circuit 20, the power supply circuit 30, and the drive control circuit 40 of FIG. 1, with reference to FIG. 3. Note that the present invention can also be applied to a configuration in which the drive circuit 20, the power supply circuit 30, and the drive control circuit 40 are divided between a plurality of chips.

In this case, a first power supply potential VDD of this embodiment of the invention is assumed to be V0. The power supply circuit 30 generates V1 to V5, based on the first power supply potential VDD and a second power supply potential VSS.

The power supply circuit 30 comprises a first logic circuit 31, first to third level shifters 32 to 34, a booster circuit 35, a constant-current circuit 36, a regulator 37, and a voltage-follower circuit 38. Note that the constant-current circuit 36, and regulator 37, and the voltage-follower circuit 38 together configure a potential generation circuit.

The drive control circuit 40 comprises a second logic circuit 41, a group of fourth level shifters 42, and a potential selection circuit (selection signal generation circuit) 43.

First to third level shifters 32 to 34 are each designed to cause a shift in the levels of a logic output I of the first logic circuit 31 and an inverted output XI thereof, and the group of fourth level shifters 42 is designed to cause a shift in the levels of a logic output I of the second logic circuit 41 and an inverted output XI thereof.

The potential selection circuit 43 within the drive control circuit 40 outputs to the drive circuit 20 a signal that selects a potential from among the potentials V0 to V5, in accordance with outputs from the group of fourth level shifters 42, to be supplied to the common electrodes and segment electrodes.

In this embodiment of the invention, |VDD−VSS| is assumed to be 3V, with VDD=0V and VSS=−3V, by way of example. The potentials applied to the liquid crystal differ in accordance with the drive duty such that a potential of 5 to 7 V is necessary when the duty is 1⁄32, or a potential of 8 to 12 V is necessary when the duty is 1⁄64, by way of example. In either case, the potential is too low when |VDD−VSS|=3V.

Figure 4:
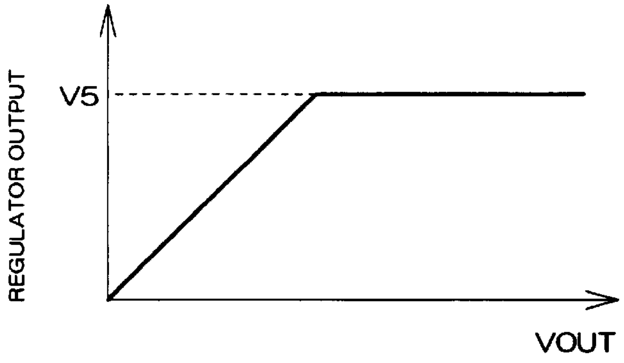
FIG. 4 shows the output characteristic of the regulator shown in FIG. 3.

In this case, the power supply circuit 30 is provided with the booster circuit 35 and the constant-current circuit 36 which boost |VDD−VSS|=3V to generate VOUT. In this embodiment, assume that VOUT=−9V. The regulator 37 generates the stable constant potential V5, based on VOUT, as shown in FIG. 4. In addition, the voltage-follower circuit 38 divides potential difference between the first power supply potential VDD=V0 and the potential V5 from the regulator 37 to generate the potentials V1 to V4. For that purpose, the voltage-follower circuit 38 comprises a resistance divider circuit 38A and first to fourth differential amplifier devices 38B to 38E, as shown by way of example in FIG. 5. The operation of these components is schematically shown in FIG. 6.

Figure 5:
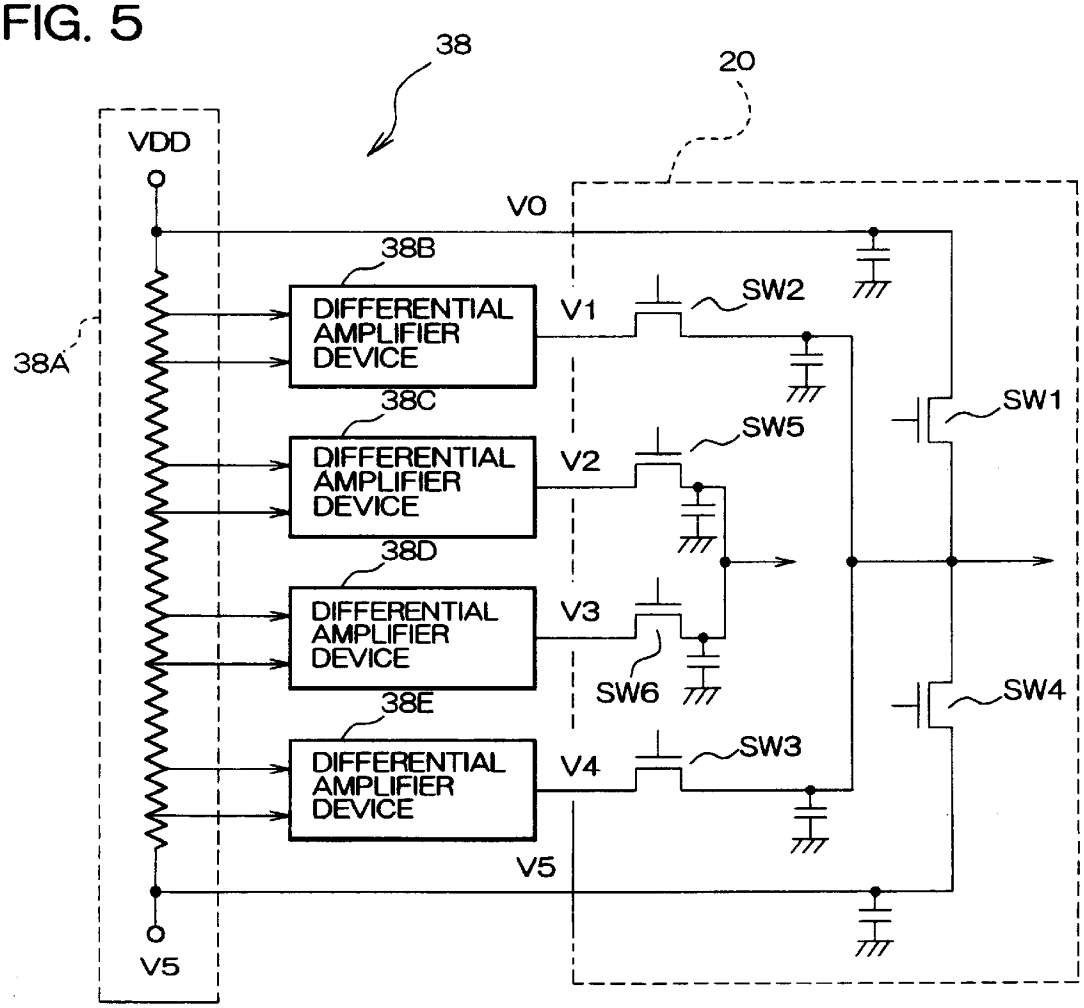
FIG. 5 is a circuit diagram of the voltage-follower circuit and part of the drive circuit shown in FIG. 3.
Figure 6:
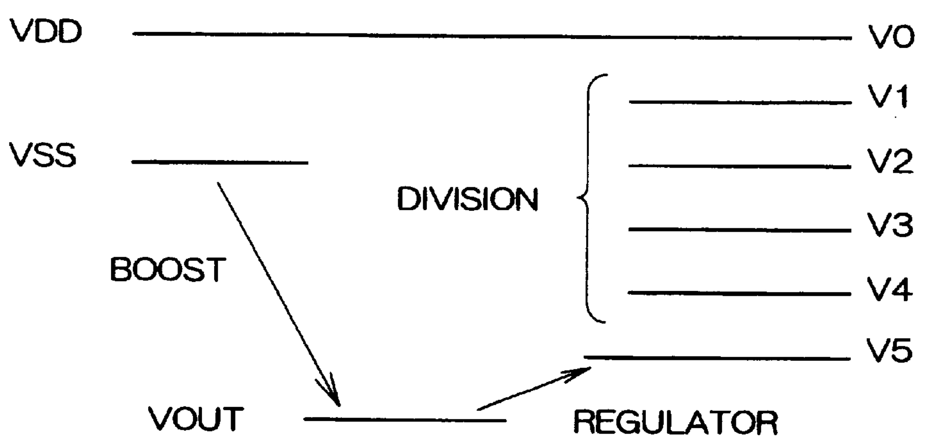
FIG. 6 illustrates the operation of the booster circuit, regulator, and voltage-follower circuit shown in FIG. 3.

The drive circuit 20 of FIG. 3 is provided of switches SW1 to SW6 configured of components such as MOS transistors, for selecting two potentials from among V0 to V5, as shown in general in FIG. 5. The potentials to be supplied to the common and segment electrodes are selected by the potential selection circuit 43 of FIG. 2 controlling the gate potentials of each of the switches SW1 to SW6.

Cause of Momentary Lighting

The discussion now turns to the cause of momentary lighting in the above described liquid crystal device.

Figure 7:
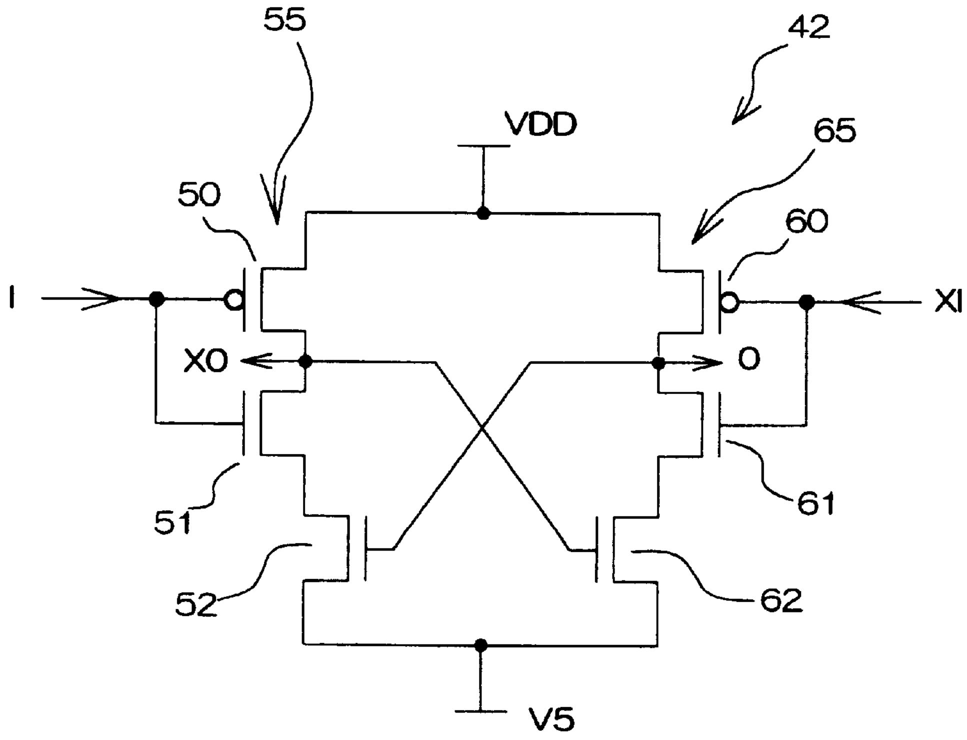
FIG. 7 is a circuit diagram of the level shifters that configure the group of fourth level shifters shown in FIG. 3.

The group of fourth level shifters 42 of FIG. 3 is shown in detail in FIG. 7. As shown in FIG. 7 this group of fourth level shifters 42 comprises first and second circuits 55 and 65 that are connected in parallel. A first PMOS transistor 50, a first NMOS transistor 51, and a second NMOS transistor 52 are connected in series between a supply line for the first power supply potential VDD (=V0) and a supply line for the potential V5, to configure the first circuit 55. The output I from the second logic circuit 41 of FIG. 3 is supplied to the gates of the first PMOS transistor 50 and the first NMOS transistor 51.

A second PMOS transistor 60, a third NMOS transistor 61, and a fourth NMOS transistor 62 are connected in series, parallel to the transistors 50 to 52, to configure the second circuit 65. The inverted output XI from the second logic circuit 41 of FIG. 3 is supplied to the gates of the second PMOS transistor 60 and the third NMOS transistor 61.

In this case, the potential between the first PMOS transistor 50 and the first NMOS transistor 51 is taken as the inverted output XO of these level shifters 42 and the potential between the second PMOS transistor 60 and the third NMOS transistor 61 is taken as the output O of these level shifters 42. The inverted output XO is supplied to the gate of the fourth NMOS transistor 62 and the output O is supplied to the gate of the second NMOS transistor 52.

The input-output characteristics of the level shifter shown in FIG. 7 is as shown in Table 1.

TABLE 1

| Input I | Input XI | Output O |
|---|---|---|
| H (VDD) | L (VSS) | H (VDD) |
| L (VSS) | H (VDD) | L (LS) |
| H (VDD) | H (VDD) | Undetermined |
| L (VSS) | L (VSS) | Undetermined |

In this case, each state I=XI=H (VDD) or I=XI=L (VSS) in Table 1 is a state that occurs when the power is forcibly cut, such as when a battery is removed. If VDD=0V and VSS=−3V, I=XI=VDD=0 V when the power is forcibly cut.

The discussion now assumes that I=H (VDD) and XI=L (VSS) in the prior-art circuit shown in FIG. 7, when in a state before power is forcibly cut, and the power is forcibly cut after that state is established.

If the power is forcibly cut in this configuration, the input I from the second logic circuit 41 becomes XI=H (VDD), the second PMOS transistor 60 changes from on to off, and the third NMOS transistor 61 changes from off to on. At this point, the V5 that is generated from VOUT, as shown in FIG. 3, also changes, but this change from V5 to VDD is slower than the change from VSS to VDD.

The reason of this will be described with reference to a threefold booster circuit 35 of the prior art, shown in detail in FIG. 8.

Figure 8:
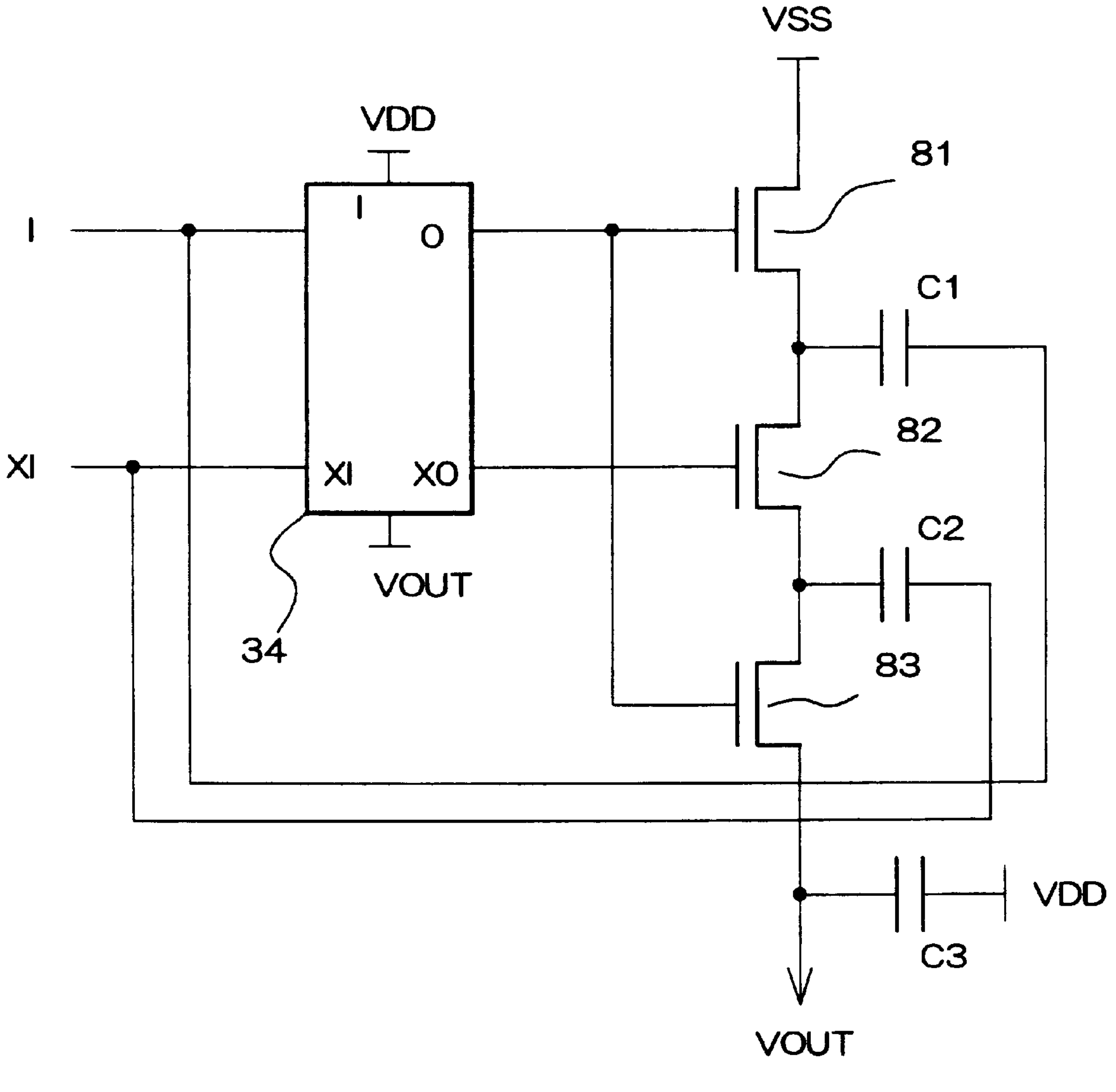
FIG. 8 is a circuit diagram of a prior-art example of the booster circuit used in the semiconductor device of FIG. 3.

In FIG. 8, an O output from the third level shifter 34 is supplied to the gates of first and third NMOS transistors 81 and 83 and the XO output from the third level shifter 34 is supplied to the gate of a second NMOS transistor 82.

This booster circuit 35 comprises capacitors C1 to C3 that are charged by the NMOS transistors 81 to 83 that that are controlled to turn on and off by the O and XO outputs of the third level shifter 34. The output potential VOUT is determined by the charge on the capacitor C3.

If the power is forcibly cut in this configuration, the charge on the capacitor C3 is discharged, but this process is slow enough that the discharge is not completed even after the first and second power supply potentials VDD and VSS have become equal. Since the potential V5 is generated from the potential VOUT, the influence of the charge on the capacitor C3 ensures that this potential V5 does not read the potential VDD (=0V) immediately.

Returning the discussion to FIG. 7, if the potential of the output O (=VDD) of the group of fourth level shifters 42 before the power is forcibly cut is assumed to be data, that data is refreshed as the charge on each capacitor is released, in a similar manner to the dynamic data preservation operation of DRAM that retains data in capacitors, which gives the same effect as a dynamic hold of the data.

In other words, the potential of the output O is lowered towards an intermediate level, by varying the on/off states of the second PMOS transistor 60 and the third NMOS transistor 61 of FIG. 7, until finally the second NMOS transistor 52 changes from on to off and the potential of the output XO rises.

If this is done, the gate potentials of the first to sixth switches (MOS transistors) SW1 to SW6 of the drive circuit 20 of FIG. 5 are changed through the potential selection circuit 43 of FIG. 3, and also the potentials V1 to V5 are not completely discharged, due to the influence of the capacitor C3 of the booster circuit of FIG. 8, so that these factors ensure that momentary lighting occurs.

Countermeasure against Momentary Lighting, by the Booster Circuit 35

Figure 9:
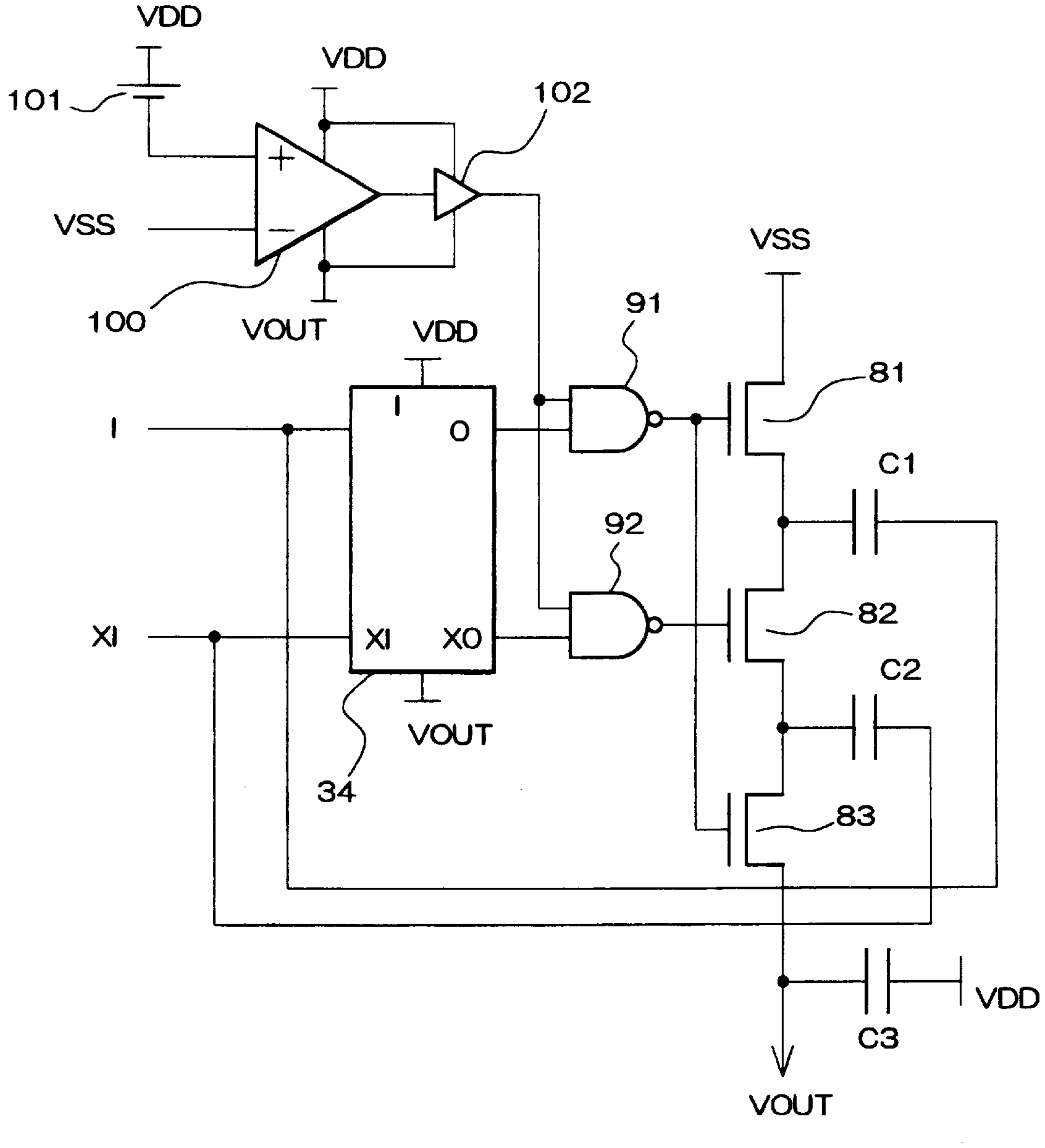
FIG. 9 is a circuit diagram of a booster circuit in accordance with an embodiment of this invention.

A circuit diagram of the booster circuit 35 of FIG. 3, in which a countermeasure to prevent this momentary lighting is implemented, is shown in FIG. 9.

The description below relates to a booster circuit 35 that boosts potentials threefold, as shown in FIG. 9. In FIG. 9, this booster circuit 35 has depletion transistors as the first to third NMOS transistors 81 to 83. In addition to the configuration shown in FIG. 8, the booster circuit 35 of FIG. 9 also comprises first and second NAND circuits 91 and 92, a comparator 100, and a buffer 102.

The output of the first NAND circuit 91 is supplied to the gates of the first and third NMOS transistors 81 and 83. The output of the second NAND circuit 92 is supplied to the gate of the second NMOS transistor 82.

The O output of the third level shifter 34 and the output of the buffer 102 are input to the first NAND circuit 91. The XO output of the third level shifter 34 and the output of the buffer 102 are input to the second NAND circuit 92.

A reference potential VREG is input to the positive terminal of the comparator 100 and the second power supply potential VSS is input to the negative terminal thereof. This reference potential VREG is generated by a reference potential generation circuit 101 on the basis of the first power supply potential VDD (=0V), and the reference potential VREG is −1.8V, by way of example. The reference potential generation circuit 101 is configured of one or a plurality of series-connected MOS transistors, and the reference potential VREG can be generated by causing the first power supply potential VDD to drop by an amount equal to the threshold potential Vth of each transistor.

Figure 11:
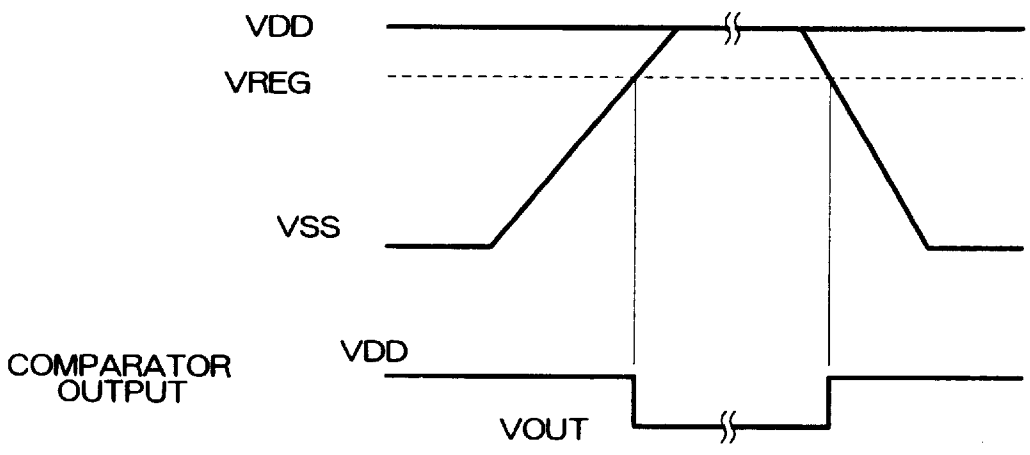
FIG. 11 is a waveform chart illustrating the output of the comparator shown in FIG. 9.

As shown in FIG. 11, the output of this comparator 100 is high (VDD) during normal power supply operation, when the second power supply potential VSS is lower than the reference potential VREG, and the output of the comparator 100 is low (VOUT) in the event of the power supply emergency, when the second power supply potential VSS is higher than the reference potential VREG, such as when the power is forcibly cut. The output of the buffer 102 is also high (VDD) during the normal power supply operation and low (VOUT) in the event of the power supply emergency.

Note that the comparator 100, the reference potential generation circuit 101, and the buffer 102 are not limited to components that are provided within the semiconductor device that has the power supply circuit 30 and other components installed therein. For example, a power-on reset signal that is input from outside the semiconductor device could be supplied to the first and second NAND circuits 91 and 92 instead of the output of the buffer 102. This power-on reset signal is an output of a detector that continuously detects the potential of an external power source, which becomes active (goes low when active, for example) when the power supply potential falls below a predetermined value. Thus the active state of this power-on reset signal is equivalent to an output from the buffer 102.

It should be emphasized that the output of the buffer 102 or the power-on reset signal is high (VDD) during the normal power supply operation. Thus the logic of the O output and XO output of the third level shifter 34 is inverted for the outputs of the first and second NAND circuits 91 and 92. In other words, if the O output is low (the I input is low) and the XO output is high (the XI input is high) during the normal power supply operation, the output of the first NAND gate 91 is high and the output of the second NAND circuit 92 is low. Conversely, if the O output is high (the I input is high) and the XO output is low (the XI input is low), the output of the first NAND gate 91 is low and the output of the second NAND circuit 92 is high.

Figure 12:
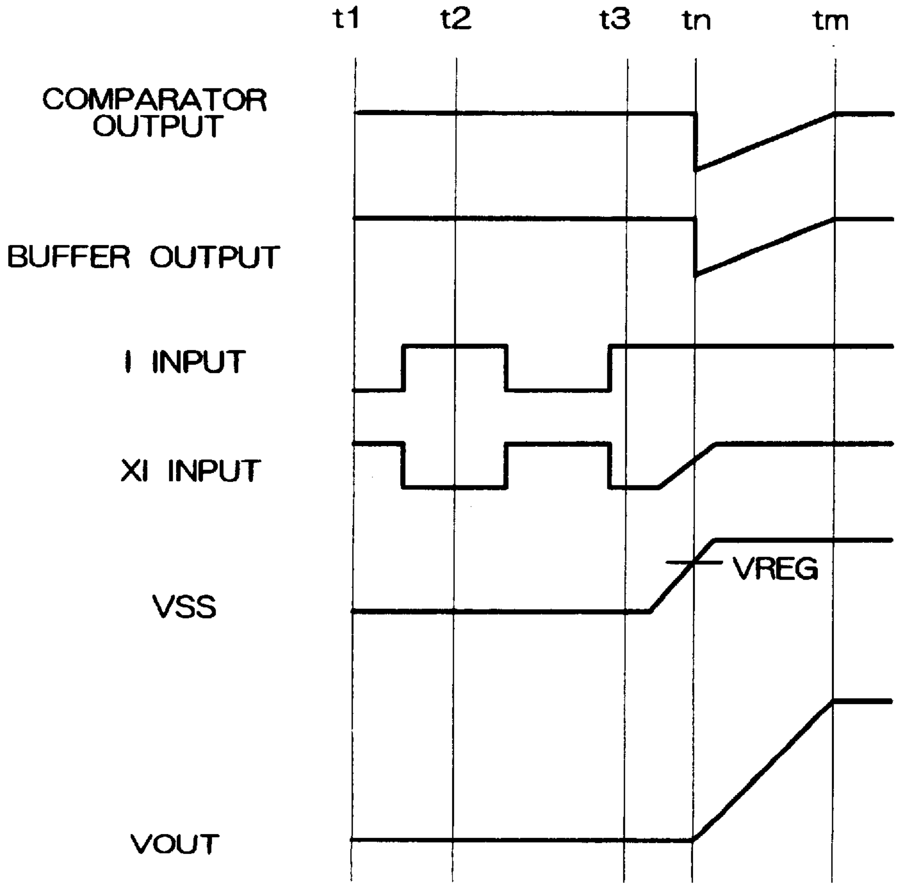
FIG. 12 is a timing chart of signals used in the operation of the booster circuit shown in FIG. 9.

In this case, assume that the first NMOS transistor 81 goes on, the second NMOS transistor 82 goes off, and the third NMOS transistor 83 goes on at timing t1 in FIG. 12. Thus, since the potentials VSS and VDD (I input) are applied to the two ends of the first capacitor C1, the potential VSS is charged into the first capacitor C1.

Next, assume that the first NMOS transistor 81 goes off, the second NMOS transistor 82 goes on, and the third NMOS transistor 83 goes off at timing t2 in FIG. 12. At this point, the I input at the other end of the second capacitor C2 changes from the potential VDD to the potential VSS, so that a potential (2VSS) is charged into the first capacitor C1.

In this case, the second NMOS transistor 82 is on and the above described potential (2VSS) is applied at one end of the second capacitor C2 while the potential VDD (XI input) is applied to the other end thereof, so that a potential of 2VSS is charged into the second capacitor C2. It should be noted, however, that the potential charged into this second capacitor C2 is not output as the potential VOUT, because the third NMOS transistor 83 is in an off state.

Assume that, once again, the first NMOS transistor 81 goes on, the second NMOS transistor 82 goes off, and the third NMOS transistor 83 goes on at timing t3 in FIG. 12. At this point, the XI input changes from the potential VDD to the potential VSS, so that the potential at the other end of the second capacitor C2 also changes from the potential VDD to the potential VSS. Thus a potential of 3VSS is charged into the second capacitor C2. This potential (3VSS) charged into the second capacitor C2 is charged into the third capacitor C3 and is also output as the potential VOUT, because the third NMOS transistor 83 is on.

Since VSS in this embodiment is −3V, a VOUT potential of −9V is obtained, implementing a threefold boost.

Assume now that the power supply is forcibly cut at an arbitrary timing tn after the timing t3 in FIG. 12, changing the outputs of the comparator 100 and the buffer 102 from high to low. Thus the outputs of the first and second NAND circuits 91 and 92 go high, regardless of the logic of the O output and XO output of the third level shifter 34.

This forces the first to third NMOS transistors 81 to 83 to turn on. The charges on the second and third capacitors C2 and C3 are therefore discharged, making it possible for the absolute value of the output potential VOUT to drop rapidly.

In this case, the I input and XI input of the third level shifter 34 both go VDD=VSS=high (0V) at timing tm in FIG. 12, due to the forcible cutting of the power.

However, if the capabilities of the first to third NMOS transistors 81 to 83 are high and their on-resistances are low, the charges on the second and third capacitors C2 and C3 can be discharged through the first to third NMOS transistors 81 to 83, before VSS becomes equal to VDD.

For that reason, it is possible to make the output potential VOUT of the booster circuit 35 drop when the power is forcibly cut, before VSS becomes equal to VDD, thus preventing the above described phenomenon of momentary lighting.

Variation of Booster Circuit

Figure 10:
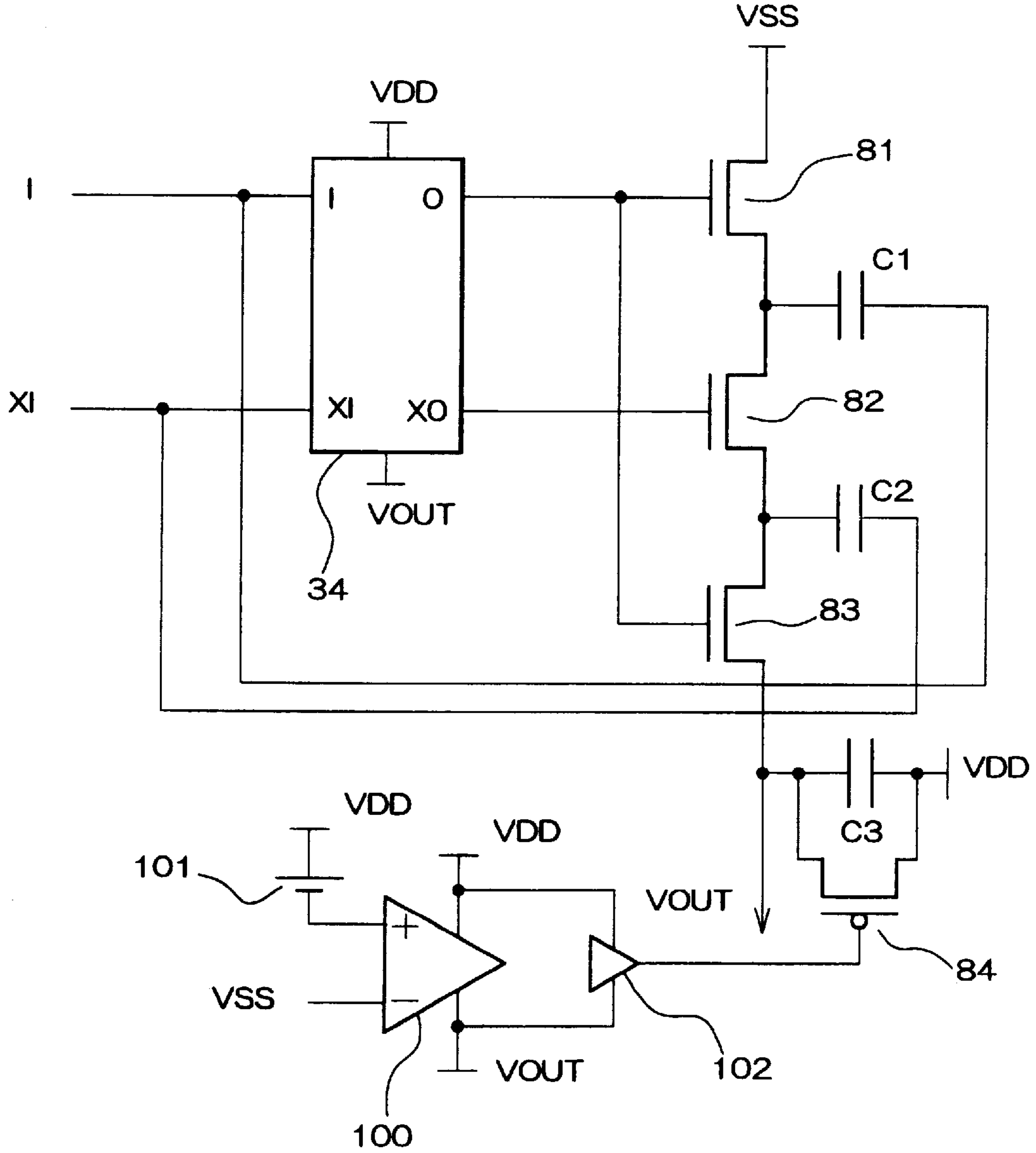
FIG. 10 is a circuit diagram of a variation of the booster circuit shown in FIG. 9.

An example of a variation of the booster circuit 35 is shown in FIG. 10. In addition to the configuration of the prior-art booster circuit shown in FIG. 8, the booster circuit 35 of FIG. 10 comprises a PMOS transistor 84 connected parallel to the second capacitor C2, and the comparator 100 and the buffer 102 which control the gate potential thereof. Note that the operation of the comparator 100 and the buffer 102 is similar to that of the circuit of FIG. 9.

The operation of boosting the power supply potential of the booster circuit 35 of FIG. 10 to three times the base value during normal operation is similar to that described with reference to FIG. 9.

In this case, if a power supply emergency occurs while the potential (3VSS) is being charged into the third capacitor C3, the output of the buffer 102 goes low, in the same manner as described with reference to FIG. 9. This turns on the PMOS transistor 84 that is connected parallel to the third capacitor C3. Thus the charge on the third capacitor C3 is discharged, preventing momentary lighting in a manner similar to that described with reference to FIG. 9.

Countermeasure against Momentary Lighting, by the VOUT Output Stage

Figure 13:
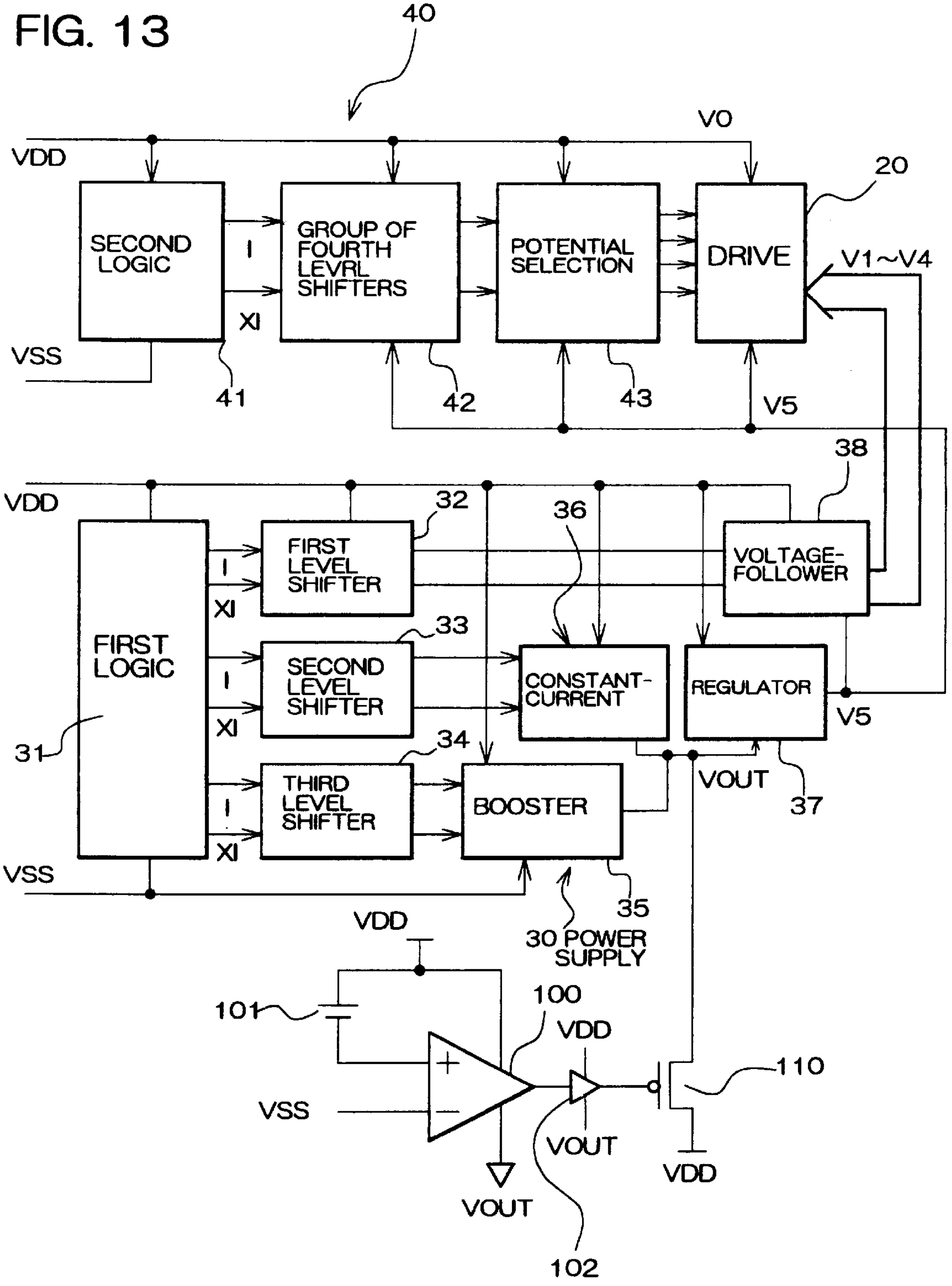
FIG. 13 illustrates another embodiment of this invention, in which VOUT is discharged.

A variation of the present invention is shown in FIG. 13, in which the output potential VOUT of the booster circuit 35 is discharged in the output stage of the prior-art booster circuit 35 having the configuration shown in FIG. 8.

As shown in FIG. 13, a powerful PMOS transistor 110 is connected between an output line L1 for VOUT and the supply line for the first power supply potential VDD, and the output of the comparator 100 is supplied to the gate thereof through the buffer 102, as described previously. Note that a power-on reset signal could be used instead of the output of the buffer 102, as previously mentioned.

The circuit configuration shown in FIG. 8 differs from that of FIG. 9 in that it is not possible to discharge the second capacitor C2 in the booster circuit 35 when the power is forcibly cut.

With the configuration of FIG. 13, the output of the buffer 102 or the power-on reset signal goes low (VOUT) when the power is forcibly cut. This forces the PMOS transistor 110 on and discharges the third capacitor C3 of FIG. 8, enabling a rapid drop in the output potential VOUT. Thus the phenomenon of momentary lighting is prevented in a manner similar to that described with reference to FIGS. 9 and 10.

It should be noted that the present invention is not limited to the embodiments described above, and thus it can be varied in many ways within the scope of the invention as laid out herein.

For example, the above embodiments were described with reference to an example of a threefold boost, but of course it is possible to apply this invention to any boost magnitude.

In addition, the present invention can be applied to various types of electronic equipment, such as a portable telephone, a game machine, an electronic organizer, a personal computer, a word processor, or a navigation device in which is installed the liquid crystal panel 10 of FIG. 1.

What is claimed is:

1. A semiconductor device with a power supply circuit, wherein said power supply circuit comprises:

a booster circuit to which first and second power supply potentials are supplied from an external power source, for boosting the absolute value of a difference between said first and second power supply potentials and for charging the boosted potential in a capacitor in said booster circuit; and a discharge circuit for causing the discharge of the potential charged into said capacitor, before said first and second power supply potentials become equal, based on a signal that becomes active in the event of a power supply emergency when the absolute value of a difference between said first and second power supply potentials falls below a predetermined value.

2. The semiconductor device as defined in claim 1, wherein said booster circuit comprises a switching circuit for turning one end of said capacitor on and off, based on a logic signal during boosting; and wherein said discharge circuit causes said switching circuit to be forcibly turned on in the event of the power supply emergency, regardless of the logic of said logic signal, to cause the discharge of the potential charged into said capacitor.

3. The semiconductor device as defined in claim 2, wherein said discharge circuit comprises:

a comparator for comparing a potential of said predetermined value with a potential of said external power source; and a logic gate circuit that controls the turning on and off of said switching circuit during a normal power supply operation, based on the logic of said logic signal, and causes said switching circuit to be forcibly turned on in the event of power supply emergency, based on the output logic of said comparator.

4. The semiconductor device as defined in claim 2, wherein a power-on reset signal that becomes active in the event of the power supply emergency is input to said discharge circuit; and wherein said discharge circuit comprises a logic gate circuit that controls the turning on and off of said switching circuit during a normal power supply operation, based on the logic of said logic signal, and causes said switching circuit to be forcibly turned on in the event of power supply emergency, based on the logic of said power-on reset signal.

5. The semiconductor device as defined in claim 1, wherein said power supply circuit comprises a potential generation circuit for generating a plurality of different potentials, based on the output potential of said booster circuit; and wherein the semiconductor device further comprises:

a drive circuit for outputting a drive potential selected from among said plurality of different potentials; and a drive control circuit for controlling said drive circuit by controlling the selection of said drive potential from among said plurality of different potentials.

6. The semiconductor device as defined in claim 5, wherein said drive control circuit comprises:

a logic circuit to which said first and second power supply potentials are input, for outputting a logic signal;

a group of level shifters to which are input said first potential and an output potential from a regulator, for shifting the level of an output of said logic circuit; and a selection signal generation circuit for generating a selection signal to be input to said drive circuit, based on an output of said group of level shifters.

7. A liquid crystal device comprising:

a semiconductor device having a power supply circuit; and a liquid crystal panel that is driven on the basis of potentials supplied from said semiconductor device;

wherein said power supply circuit comprises:

a booster circuit to which first and second power supply potentials are supplied from an external power source, for boosting the absolute value of a difference between said first and second power supply potentials and for charging the boosted potential in a capacitor in said booster circuit; and a discharge circuit for causing the discharge of the potential charged into said capacitor, before said first and second power supply potentials become equal, based on a signal that becomes active in the event of a power supply emergency when the absolute value of a difference between said first and second power supply potentials falls below a predetermined value.

8. The liquid crystal device as defined in claim 7, wherein said booster circuit comprises a switching circuit for turning one end of said capacitor on and off, based on a logic signal during boosting; and wherein said discharge circuit causes said switching circuit to be forcibly turned on in the event of the power supply emergency, regardless of the logic of said logic signal, to cause the discharge of the potential charged into said capacitor.

9. The liquid crystal device as defined in claim 8, wherein said discharge circuit comprises:

a comparator for comparing a potential of said predetermined value with a potential of said external power source; and a logic gate circuit that controls the turning on and off of said switching circuit during a normal power supply operation, based on the logic of said logic signal, and causes said switching circuit to be forcibly turned on in the event of power supply emergency, based on the output logic of said comparator.

10. The liquid crystal device as defined in claim 8, wherein a power-on reset signal that becomes active in the event of the power supply emergency is input to said discharge circuit; and wherein said discharge circuit comprises a logic gate circuit that controls the turning on and off of said switching circuit during a normal power supply operation, based on the logic of said logic signal, and causes said switching circuit to be forcibly turned on in the event of power supply emergency, based on the logic of said power-on reset signal.

11. The liquid crystal device as defined in claim 7, wherein said power supply circuit comprises a potential generation circuit for generating a plurality of different potentials, based on the output potential of said booster circuit; and wherein the semiconductor device further comprises:

a drive circuit for outputting a drive potential selected from among said plurality of different potentials; and a drive control circuit for controlling said drive circuit by controlling the selection of said drive potential from among said plurality of different potentials.

12. The liquid crystal device as defined in claim 11, wherein said drive control circuit comprises:

a logic circuit to which said first and second power supply potentials are input, for outputting a logic signal;

a group of level shifters to which are input said first power supply potential and an output potential from a regulator, for shifting the level of an output of said logic circuit; and a selection signal generation circuit for generating a selection signal to be input to said drive circuit, based on an output of said group of level shifters.

13. Electronic equipment comprising the liquid crystal device as defined in claim 7.

* * * * *